United States Patent
Kong et al.

(10) Patent No.: US 12,464,327 B2
(45) Date of Patent: Nov. 4, 2025

(54) DEVICE AND SERVER FOR MULTICAST SERVICE

(71) Applicant: LG ELECTRONICS INC., Seoul (KR)

(72) Inventors: Kwangsik Kong, Seoul (KR); Hakseong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 472 days.

(21) Appl. No.: 17/918,285

(22) PCT Filed: Sep. 23, 2020

(86) PCT No.: PCT/KR2020/012821
§ 371 (c)(1),
(2) Date: Oct. 11, 2022

(87) PCT Pub. No.: WO2022/065534
PCT Pub. Date: Mar. 31, 2022

(65) Prior Publication Data
US 2023/0156440 A1    May 18, 2023

(51) Int. Cl.
*H04W 4/40* (2018.01)
*H04W 4/021* (2018.01)
*H04W 4/06* (2009.01)

(52) U.S. Cl.
CPC ............ *H04W 4/40* (2018.02); *H04W 4/021* (2013.01); *H04W 4/06* (2013.01)

(58) Field of Classification Search
CPC ......... H04W 4/40; H04W 4/021; H04W 4/06; H04W 4/42; H04W 4/44; H04W 4/46; H04W 8/24; H04W 48/10; H04W 48/20; H04W 88/04; H04W 76/10
USPC ....................................................... 455/414.1
See application file for complete search history.

(56) References Cited

U.S. PATENT DOCUMENTS

| | | | |
|---|---|---|---|
| 11,284,221 B2* | 3/2022 | Guo | H04W 4/06 |
| 2010/0265867 A1* | 10/2010 | Becker | H04W 72/30 |
| | | | 370/312 |
| 2011/0103293 A1 | 5/2011 | Gale et al. | |
| 2017/0251342 A1 | 8/2017 | Bhalla | |
| 2018/0262887 A1* | 9/2018 | Futaki | H04W 36/30 |

(Continued)

FOREIGN PATENT DOCUMENTS

| | | |
|---|---|---|
| CN | 108029099 A | 5/2018 |
| CN | 110301143 A | 10/2019 |

(Continued)

OTHER PUBLICATIONS

Extended European Search Report for European Application No. 20955332.0, dated Mar. 13, 2024.

(Continued)

*Primary Examiner* — Jean A Gelin
(74) *Attorney, Agent, or Firm* — Birch, Stewart, Kolasch & Birch, LLP

(57) ABSTRACT

Provided are a vehicle-to-everything (V2X) device and a V2X server for a multicast service. The V2X device determines a service area for a multicast service and generates a first logical channel for requesting subscription of the multicast service. The V2X device transmits, to the V2X server, a service support message including information about the service area and the first logical channel.

6 Claims, 9 Drawing Sheets

(56) References Cited

U.S. PATENT DOCUMENTS

| | | | |
|---|---|---|---|
| 2018/0324560 A1 | 11/2018 | Xu et al. | |
| 2019/0124623 A1* | 4/2019 | Xu | H04W 76/40 |
| 2019/0174449 A1 | 6/2019 | Shan et al. | |
| 2019/0349730 A1* | 11/2019 | Kim | H04W 4/40 |
| 2020/0053699 A1* | 2/2020 | Chen | H04W 4/44 |
| 2020/0068357 A1 | 2/2020 | Lisewski et al. | |
| 2020/0100048 A1* | 3/2020 | Wu | H04L 1/1829 |
| 2020/0178048 A1* | 6/2020 | Kim | H04W 12/062 |
| 2020/0205225 A1 | 6/2020 | Hu et al. | |
| 2020/0260233 A1* | 8/2020 | Yang | H04W 76/11 |
| 2020/0280842 A1 | 9/2020 | Lis et al. | |
| 2021/0084453 A1* | 3/2021 | Wang | H04W 4/021 |
| 2021/0329720 A1* | 10/2021 | Balasubramanian | H04W 72/02 |
| 2024/0365094 A1* | 10/2024 | Futaki | H04W 36/08 |

FOREIGN PATENT DOCUMENTS

| | | |
|---|---|---|
| CN | 110574351 A | 12/2019 |
| CN | 111586670 A | 8/2020 |
| KR | 10-2018-0093671 A | 8/2018 |
| KR | 10-2020-0023116 A | 3/2020 |
| KR | 10-2020-0086478 A | 7/2020 |
| WO | WO 2017/160134 A1 | 9/2017 |

OTHER PUBLICATIONS

3GPP, "3rd Generation Partnership Project; Technical Specification Group Services and System Aspects; Architecture enhancements for V2X services, (Release 16)", Technical Specification, 3GPP TS 23.285 V16.3.0, Jul. 9, 2020, total 40 pages.

Ericsson, "pCR V2X application server and V2X service discovery", S6-190467, 3GPP TSG-SA WG6 Meeting #29, Montreal, Canada, Mar. 4, 2019, total 7 pages.

Ericsson, "Procedure for V2X uplink message delivery", S6-190953, 3GPP TSG-SA WG6 Meeting #31, Bruges, Belgium, May 13, 2019, total 6 pages.

Zte et al., "Discussion on multicast/broadcast transmission area", R3-205246, 3GPP TSG-RAN WG3 #109-e, online, Aug. 7, 2020, total 8 pages.

* cited by examiner

FIG. 3
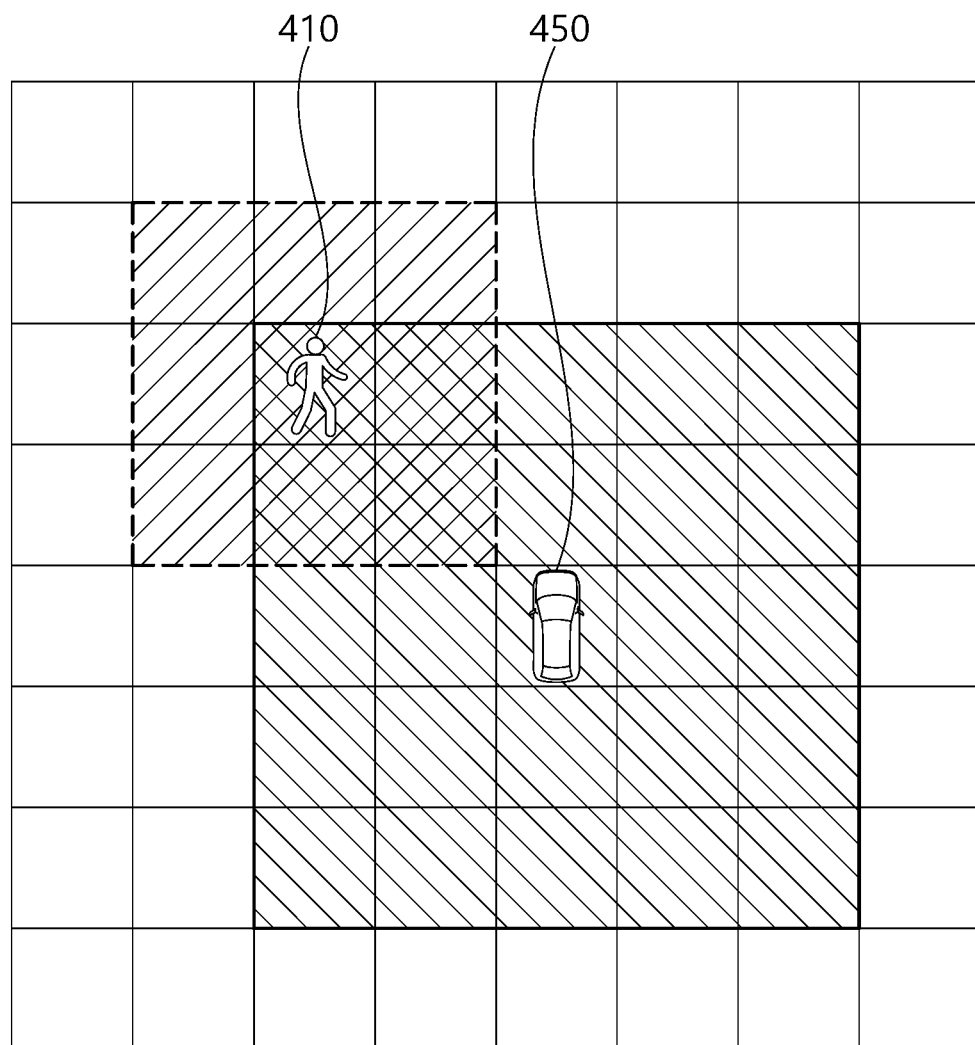
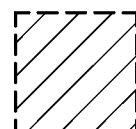 : First Subscription Area
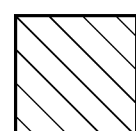 : Second Subscription Area

DEVICE AND SERVER FOR MULTICAST SERVICE

CROSS REFERENCE TO RELATED APPLICATION

This application is the National Phase of PCT International Application No. PCT/KR2020/012821, filed on Sep. 23, 2020, which is hereby expressly incorporated by reference into the present application.

BACKGROUND OF THE DISCLOSURE

Field

The present disclosure relates to a server and a road side unit (RSU) for vehicle-to-everything (V2X) service.

Related Art

A vehicle is an apparatus which moves a passenger from one place to another place. A representative example is a car. A vehicle-to-everything (V2X) communication technology, which means vehicle-to-object communication, refers to a technology in which the vehicle communicates with other vehicles, pedestrians, road infrastructures, servers, and the like to provide a series of services.

For the V2X, standardization organizations such as Institute of Electrical and Electronics Engineers (IEEE), 3rd Generation Partnership Project (3GPP), etc. provide various communication specifications. Dedicated Short Range Communications (DSRC) is the communication standard protocol based on IEEE 802.11p. Cellular-V2X (C-V2X) is the communication standard protocol based on cellular communication protocol of 3GPP. In general, V2X has focused on vehicle safety through direct communication between vehicles, but recently V2X includes vehicle-to-infrastructure communication for communicating with peripheral devices via a network.

Attempts are being made to extend V2X technology to be applied to pedestrians and other electronic devices, rather than simply being used for vehicle safety, such as vehicle-to-vehicle and vehicle-to-peripheral devices.

SUMMARY OF THE DISCLOSURE

The present disclosure provides a vehicle-to-everything (V2X) device and a V2X server for multicast service.

In an aspect, a V2X device for V2X service includes a processor, and a memory operatively coupled with the processor and configured to store instructions that, when executed by the processor, cause the V2X device to perform functions. The functions include determining a service area for a multicast service, generating a first logical channel for requesting a subscription of the multicast service, transmitting, to a V2X server, a service support message, the service support message including information on the service area and the first logical channel, receiving, from a consumer device through the V2X server, a service request message for requesting the multicast service, the service request message including information on a second logical channel for approving the multicast service, and transmitting, to the V2X server, a service approval message through the second logical channel.

In another aspect, a non-transitory computer-readable medium has computer-readable instructions stored thereon that are executable by a processor perform functions. The functions include determining a service area for a multicast service, generating a first logical channel for requesting a subscription of the multicast service, transmitting, to a V2X server, a service support message, the service support message including information on the service area and the first logical channel, receiving, from a consumer device through the V2X server, a service request message for requesting the multicast service, the service request message including information on a second logical channel for approving the multicast service, and transmitting, to the V2X server, a service approval message through the second logical channel.

In still another aspect, a V2X server for V2X service includes a processor, and a memory operatively coupled with the processor and configured to store instructions that, when executed by the processor, cause the V2X server to perform functions. The functions include setting a subscription area to a consumer device, receiving, from a provider device, a service support message, the service support message including information on a service area for a multicast service and a first logical channel for requesting a subscription of the multicast service, and, when the service area overlaps with the subscription area, transmitting the service support message to the consumer device.

It is possible to provide V2X services to more diverse users as well as vehicles.

BRIEF DESCRIPTION OF THE DRAWINGS

FIG. 3 shows an example in which a subscription area is set.

DETAILED DESCRIPTION OF THE EMBODIMENTS

Figure 1:
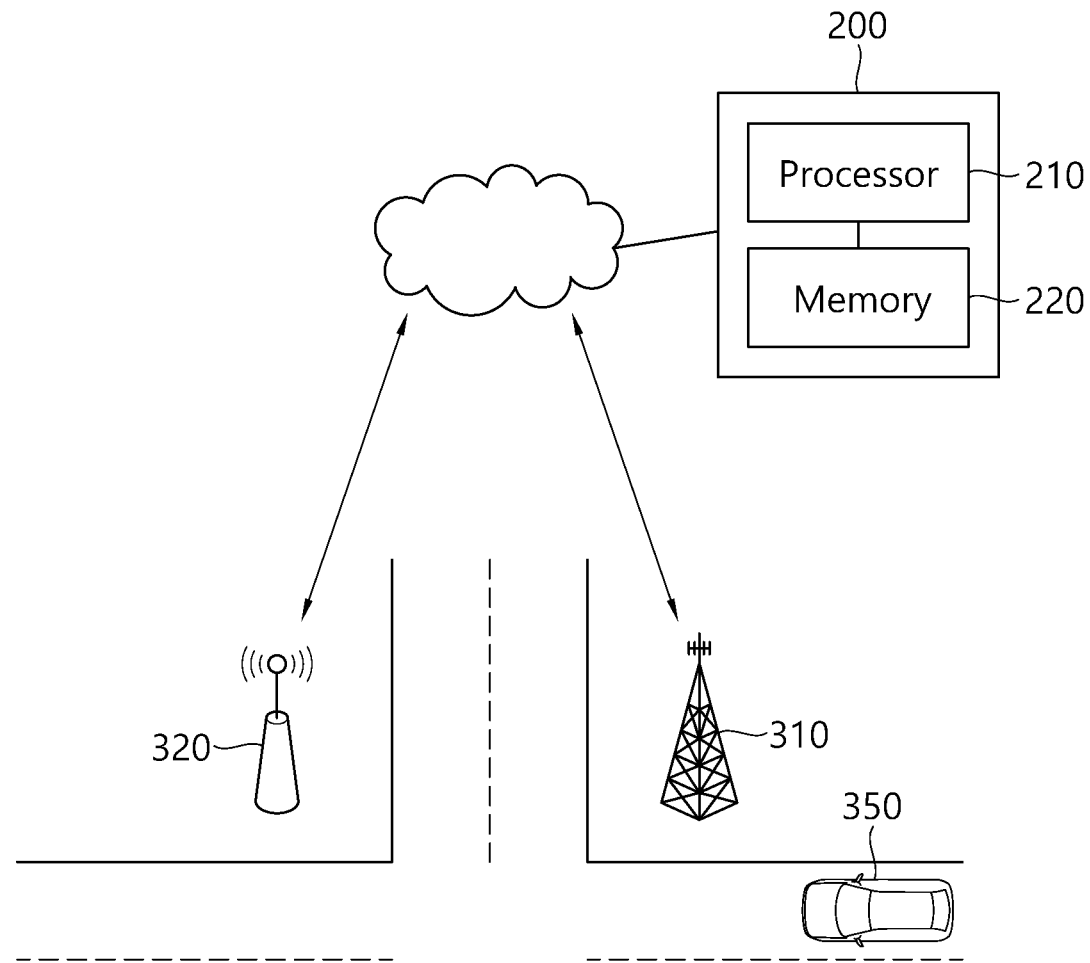
FIG. 1 shows a system to which an embodiment of the present specification is applied.

Hereinafter, the embodiments disclosed in the present specification will be described in detail with reference to the accompanying drawings, but the same or similar components are assigned the same reference numbers regardless of reference numerals, and redundant description thereof will be omitted. The suffixes "module" and "unit" for the components used in the following description are given or mixed in consideration of only the ease of writing the specification, and do not have distinct meanings or roles by themselves. In addition, in describing the embodiments disclosed in the present specification, if it is determined that detailed descriptions of related known technologies may obscure the gist of the embodiments disclosed in the present specification, the detailed description thereof will be omitted. In addition, the accompanying drawings are only for easy understanding of the embodiments disclosed in the present specification, and the technical ideas disclosed in the present specification are not limited by the accompanying drawings.

Terms including an ordinal number, such as first, second, etc., may be used to describe various elements, but the elements are not limited by the terms. The above terms are used only for the purpose of distinguishing one component from another.

When an element is referred to as being "connected" or "coupled" to another element, it is understood that it may be directly connected or coupled to the other element, but other elements may exist in between. On the other hand, when it is mentioned that a certain element is "directly connected" or "directly coupled" to another element, it should be understood that no other element is present in the middle.

The singular expression includes the plural expression unless the context clearly dictates otherwise.

In the present application, terms such as "comprises" or "have" are intended to designate that the features, numbers, steps, operations, components, parts, or combinations thereof described in the specification exist, but it is to be understood that this does not preclude the possibility of addition or existence of one or more other features, numbers, steps, operations, components, parts, or combinations thereof.

A vehicle according to an embodiment of the present specification can be defined as a means of transport traveling on a road or track. Vehicles may include automobiles, ships, aircraft, trains, motorcycles, bicycles, and the like. The vehicle may include an internal combustion engine vehicle having an engine as a power source, a hybrid vehicle having an engine and an electric motor as a power source, an electric vehicle having an electric motor as a power source, and combinations thereof.

A vehicle-to-everything (V2X) device according to an embodiment of the present specification refers to a device that provides V2X functions and V2X services to users based on software, and is also referred to as a SoftV2X device. The V2X device may be implemented based on hardware and/or software in an electronic device operated by a user such as User Equipment (UE), mobile station (MS), mobile terminal (MT), user terminal (UT), cellular phone, laptop, handheld device, tablet, drone, consumer electronics, and the like. The V2X device may be mounted on a vehicle or electronic device as an on-board unit (OBU) to provide V2X functions and services to the vehicle. A V2X device disposed inside or outside the vehicle may be connected to the vehicle through a wireless interface to provide V2X functions and V2X services to the vehicle.

FIG. 1 shows a system to which an embodiment of the present specification is applied.

A system includes a V2X device 100 and a V2X server 200. The V2X device 100 may communicate with the V2X server 200 through the base station 310 or a Road Side Unit (RSU) 320. The V2X device 100 may communicate with the base station 310, the RSU 320, a neighbor vehicle 350 and/or a neighbor V2X device using a wireless communication protocol. There is no limitation on the wireless communication protocol. The wireless communication protocol may include Dedicated Short Range Communications (DSRC), Cellular-V2X (C-V2X), WiFi, BLUETOOTH and/or cellular communication protocols based on 3rd Generation Partnership Project (3GPP) (e.g. Wideband Code Division Multiple Access (WCDMA), Long Term Evolution (LTE), New Radio (NR), etc.).

The V2X server 200 receives one or more V2X messages from the V2X device 100 within a managed area. The V2X server 200 may forward the one or more collected V2X messages to the subscribing V2X device 100.

The V2X message may periodically or aperiodically be transmitted to the V2X server 200 by the V2X device 100 (or RSU 320), and is a message providing status information of the V2X device 100 (or device managed by the RSU 320). For example, the V2X device 100 may transmit 10 V2X messages per second. The V2X server 200 collects V2X messages from multiple V2X devices, and forwards the V2X messages to subscribing V2X devices.

The following table shows examples of information elements included in the V2X message. Not all information elements are required, and names are examples only. Information elements may be added/changed/deleted according to policies or circumstances.

TABLE 1

| Name | Description |
| --- | --- |
| V2X ID | A temporary identifier (ID) for identifying the V2X device sending this message. It is randomly selected by the V2X device and may be changed periodically. The size can be 4 octets. |
| Position | Indicates the location of the V2X device. May contain latitude, longitude and elevation. |
| Position Accuracy | Including the quality of various parameters used to model the accuracy of positioning. |
| Velocity | Indicates the velocity of the V2X device. |
| Heading | Indicates the current heading (direction of motion) of the V2X device. |
| Path History | defines a geometric path reflecting V2X device's movement over some period of time and/or distance |
| Acceleration | Indicates the acceleration of the V2X device. May include a set of acceleration values for three orthogonal directions of the V2X device: a longitudinal axis, a lateral axis, and a vertical axis. |
| Device Type | Indicates the type of V2X device. Example: pedestrian, automobile, bicycle, etc. |
| Publishing Area | To be described later |

The V2X message transmitted by the V2X device 100 to the V2X server 200 is called an uplink (UL) V2X message, and the V2X message transmitted by the V2X server 200 to the V2X device 100 is called a downlink (DL) V2X message.

The V2X device 100 may include a processor 110 and a memory 120. The processor 110 implements the functions of the V2X device 100 and may include one or more software modules. The V2X device 100 may further include various additional devices according to functions such as a display, a user interface, and a wireless modem.

The V2X server 200 is connected to one or more base stations 310 and/or RSU 320 and includes computing hardware that provides V2X functions and V2X services to the V2X device 100. The V2X server 200 may be a Mobile/Multi-access Edge Computing (MEC)-based server or a centralized-based server. The V2X server 200 may be called another name, such as a Geocast server or a SoftV2X server. The V2X server 200 may include a processor 210 and a memory 220. The processor 210 implements the function of the V2X server 200, and may include one or more software modules.

The processors 110 and 210 may include Application-Specific Integrated Circuits (ASICs), Central Processing Unit (CPU), Application Processor (AP), Digital Signal Processor (DSP), Digital Signal Processing Device (DSPD), Programmable Logic Device (PLD), Field Programmable Gate Array (FPGA), micro-controller, chipset, logic circuits, data processing device and/or combinations thereof. In the software implementation for the following embodiments, the software code for performing the functions described herein may be stored in the memories 120 and 220 and executed by the processors 110 and 210.

Memories 120 and 220 may store information accessible by processors 110 and 210. The information may include instructions executable by the processors 110 and 210 and/or data processed by the processor. Memories 120 and 220 may include any form of computer-readable medium operable to store information. For example, the memories 120 and 220 include read only memory (ROM), random access memory (RAM), digital video disc (DVD), optical disc, flash memory, solid state drive (SSD), hard drive and combinations thereof.

Message Queuing Telemetry Transport (MQTT) is used as a message queuing protocol between the V2X device 100 and the V2X server 200, but this is only an example. Advanced Message Queuing Protocol (AMQP), HyperText Transfer Protocol (HTTP), and/or vendor specific protocols may be used.

Now, setting an area for V2X service will be described in more detail. Hereinafter, a tile refers to a geographic basic unit for setting a subscription area. Hereinafter, a rectangle is shown in the form of a tile, but it is only an example. There are no restrictions on the shape of the tile, such as polygons or circles.

Figure 2:
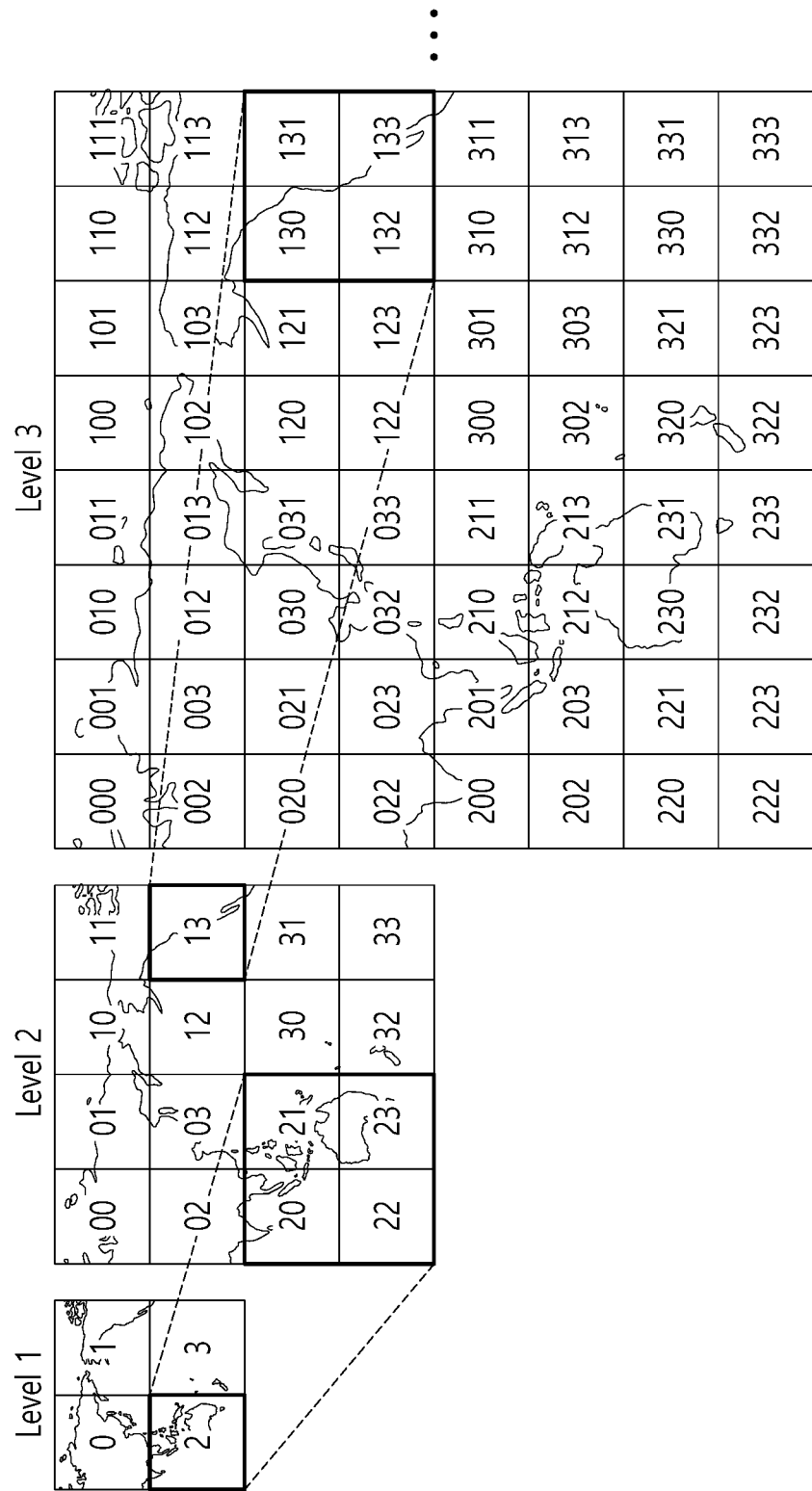
FIG. 2 shows an example of a tile using a quadtree.

FIG. 2 shows an example of a tile using a quadtree.

The quadtree represents a partition of space in two dimensions by decomposing a map (i.e. world map) into four equal quadrants, subquadrants, and so on. The size of a quadrant varies according to a zoom level, and each quadrant corresponds to a tile. Here, the case where the levels are 1, 2, and 3 is shown. The larger the level, the smaller the size of the tile. At each level, a unique ID is assigned to a tile. The tile ID may have the number of bits corresponding to the level.

The V2X device may acquire the ID of the tile in which it is located based on its location information (e.g. latitude and longitude). The V2X device and/or the V2X server may adjust the size of the area by adjusting the level according to the situation.

In the following embodiment, the area for the V2X service is defined as follows.

Management area: The area managed by the V2X server. The management area includes one or more tiles.

Subscription area: The area where the V2X device requests a subscription to the V2X server. The subscription area may be referred to as another name, such as a concerned area, an impact area, or a geocast area. The subscription area contains one or more tiles. The subscription area may be included in one management area, and may be defined across a plurality of management areas managed by a plurality of V2X servers.

Publishing area: The area where the V2X device publishes V2X messages to the V2X server. The publishing area may include one tile in each level. The publishing area may indicate a tile where the V2X device is currently located. Some or all of the publishing area may overlap with the subscription area.

FIG. 3 shows an example in which a subscription area is set.

A first subscription area is set to the first V2X device 410, and a second subscription area is set to the second V2X device 450. Each V2X device can set/change/delete the subscription area periodically or aperiodically (e.g. when its location is changed). Each V2X device can request setting/change/deletion of the subscription area to the V2X server.

The number of tiles included in the first subscription area is 9 and the number of tiles included in the second subscription area is 25, but the number of tiles included in the subscription area or the shape of the subscription area is not limited. The subscription area may include a tile in which the V2X device is located. Alternatively, the subscription area may include one or more tiles other than a tile in which the V2X device is located.

The first V2X device 410 may generate a first V2X message and periodically send the first V2X message to the V2X server. The second V2X device 450 may generate a second V2X message and periodically send the second V2X message to the V2X server.

The V2X server may forward one or more V2X messages received in or around a subscription area to the V2X device related to the subscription area.

A device that sets a subscription area may be referred to as a "subscriber device". A device that transmits a V2X message to a V2X server can be referred to as a "provider device". A V2X device may be a subscriber device, a provider device, or both a subscriber device and a provider device. The V2X server may forward the V2X messages transmitted by the provider devices in the management area to the subscriber device.

The V2X server may deliver the V2X message of a provider device "associated" to the subscription area of a subscriber device to the subscriber device. A provider device associated with a subscription area of a subscriber device may be referred to as a "subscribed provider device". The provider device associated with the subscription area of the subscriber device may satisfy at least one of the following conditions (i) to (iii): (i) Part or all of the publishing area of the provider device overlaps with the subscription area of the subscriber device. (ii) some or all of the subscription area of the provider device overlaps the subscription area of the subscriber device; and/or (iii) The location where the provider device transmits the V2X message is within the subscription area of the subscriber device.

According to condition (i) or (iii), the V2X server delivers V2X messages received in the first subscription area to the first V2X device 410. The V2X server delivers V2X messages received in the second subscription area to the second V2X device 450.

Since the first V2X device 410 is located in the second subscription area, the V2X server may forward the first V2X message to the second V2X device 450. The second V2X device 450 is a subscriber device, and the first V2X device 410 is a subscribed provider device.

Since the second V2X device 450 is not located in the first subscription area (which means that condition (i) or condition (iii) is not satisfied), the V2X server does not forward the second V2X message to the first V2X device 410. The second V2X device 450 is not a provider device of the first V2X device 410. If condition (ii) is considered, the second V2X device 450 may be a provider device of the first V2X device 410.

Figure 4:
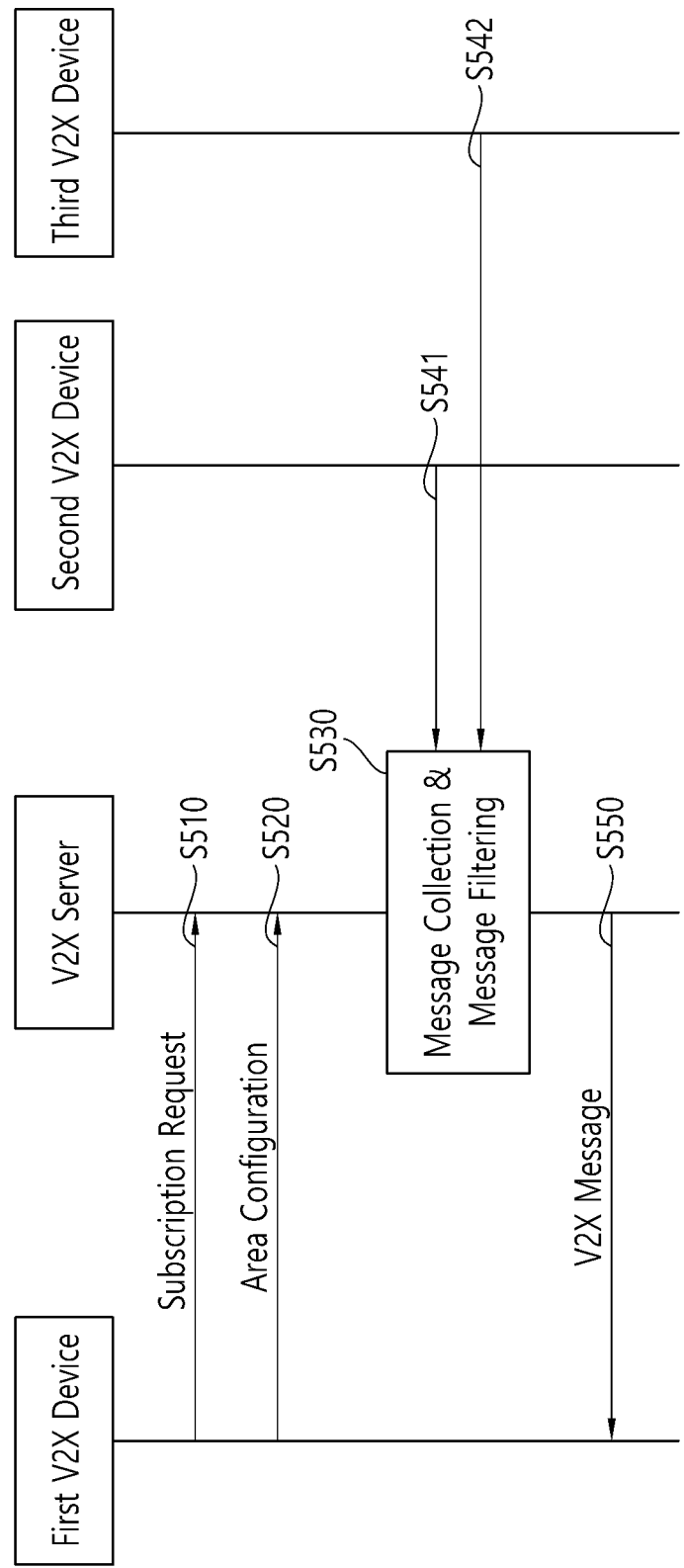
FIG. 4 is a flowchart illustrating a method for a V2X service according to an embodiment of the present specification.

FIG. 4 is a flowchart illustrating a method for a V2X service according to an embodiment of the present specification.

In step S510, a V2X device sends a subscription request for requesting subscription of the V2X service to a V2X server. The subscription request may include information about the identifier, location, etc. of the V2X device. The V2X server may transmit a subscription response for granting or rejecting subscription to the V2X device in response to the subscription request.

In step S520, the V2X device may send the area configuration related to the V2X service to the V2X server. The area configuration may be included in a separate message or included in the subscription request. The area configuration includes information about configuration and/or modification of the subscription area.

In step S530, the V2X server may collect V2X messages from V2X devices in the management area, and perform message filtering.

The V2X server receives the first V2X message from the second V2X device (step S541), and receives the second V2X message from the third V2X device (step S542). Assume that the second V2X device belongs to the subscription area of the first V2X device, but the third V2X device does not belong to the subscription area of the first V2X device.

In step S550, the V2X server publishes the first V2X message belonging to the subscription area of the first V2X device to the first V2X device. The first V2X device is a subscriber device and the second V2X device is a provider device. Since a V2X message of the third V2X device is not delivered to the first V2X device, the third V2X device is not a provider device of the first V2X device.

If there are a plurality of V2X messages to be sent to the first V2X device, the plurality of V2X messages may be published separately or as a single message.

Message filtering is that V2X server filters the V2X messages to be transmitted to V2X devices that have completed the subscription request. Message filtering may be referred to as a process of selecting a subscribed provider device associated with a subscriber device among a plurality of provider devices. Filtering conditions may be defined differently depending on the subscription area and/or the state of the V2X device. For example, if the number of V2X devices in the subscription area is large, the filtering conditions may be modified so that more messages are filtered out. Filtering condition may be related to the degree of risk of the V2X device.

Hereinafter, multicast communication (or group cast communication) between one provider device and a plurality of consumer devices using a V2X server will be described.

First, the following terms are defined.

SP-V2X (Service Provider-V2X): A V2X device that provides multicast service.

SC-V2X (Service Consumer-V2X): A V2X device that consumes multicast service provided by SP-V2X.

TST (Temporary Service Topic): A logical channel from SC-V2X to SP-V2X for requesting subscription of service. One TST is generated per provider's service.

TSRT (Temporary Service Request Topic): A logical channel from SP-V2X to SC-V2X for approving subscription of service. One TSRT is generated per user.

Service Topic: A logical channel for the service provided by SP-V2X. One service topic is generated per provider device's service.

Service Area: An area in which a service is provided and may include one or more tiles. It may be determined based on position/speed/heading/surrounding environment of the SP-V2X. It can be said to be a logical channel from SP-V2X to V2X devices in the service area.

Hereinafter, a service refers to a service for multicast (or groupcast). The multicast service may be applied to cooperative driving, see-through system, and the like. Cooperative driving refers to driving while sharing surrounding traffic and environmental conditions with other drivers (and/or other V2X devices). The see-through system means that the SC-V2X receives the video streaming service provided by the SP-V2X.

Figure 5:
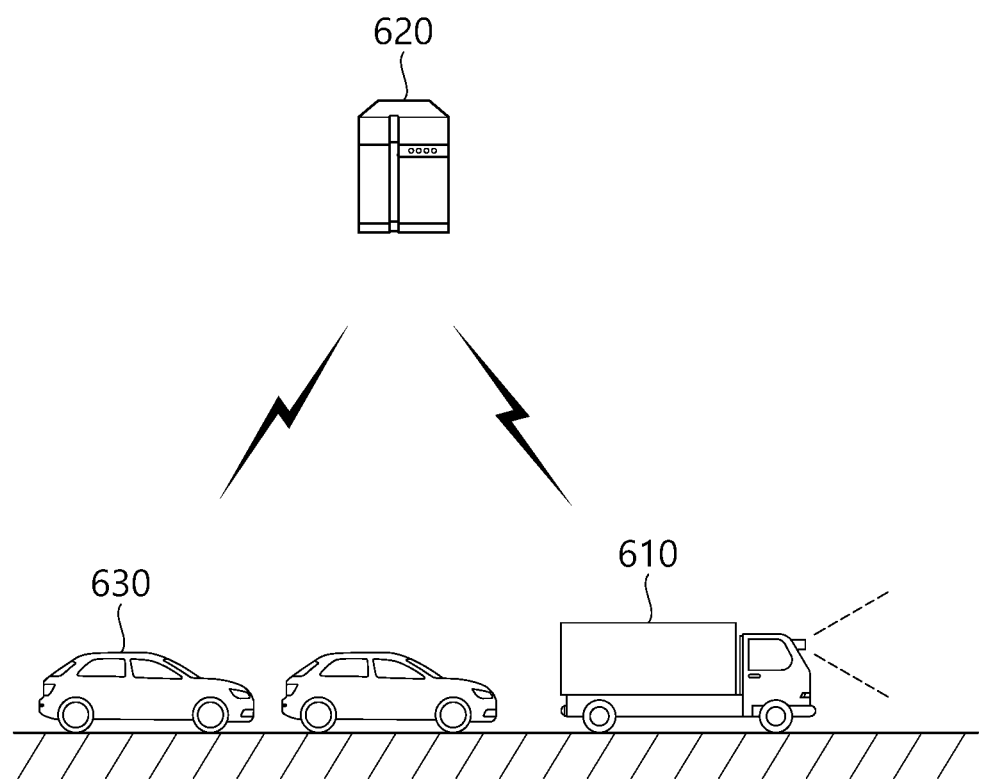
FIG. 5 shows an example of a system for a multicast V2X service according to an embodiment of the present specification.

FIG. 5 shows an example of a system for a multicast V2X service according to an embodiment of the present specification.

Assume that a truck 610 driving ahead provides a video streaming service about road conditions to following vehicles. The truck 610 is an SP-V2X, and the vehicle 630 is an SC-V2X. Although only one SC-V2X is shown, this is only an example. Both SP-V2X 610 and SC-V2X 630 communicate with a V2X server 620.

While a multicast service is provided, a continuous connection between SP-V2X and SC-V2X is required. Hereinafter, a method in which the SP-V2X first broadcasts a service to provide multi-service and a method in which the SC-V2X first requests a desired service and receives the service will be described.

Figure 6:
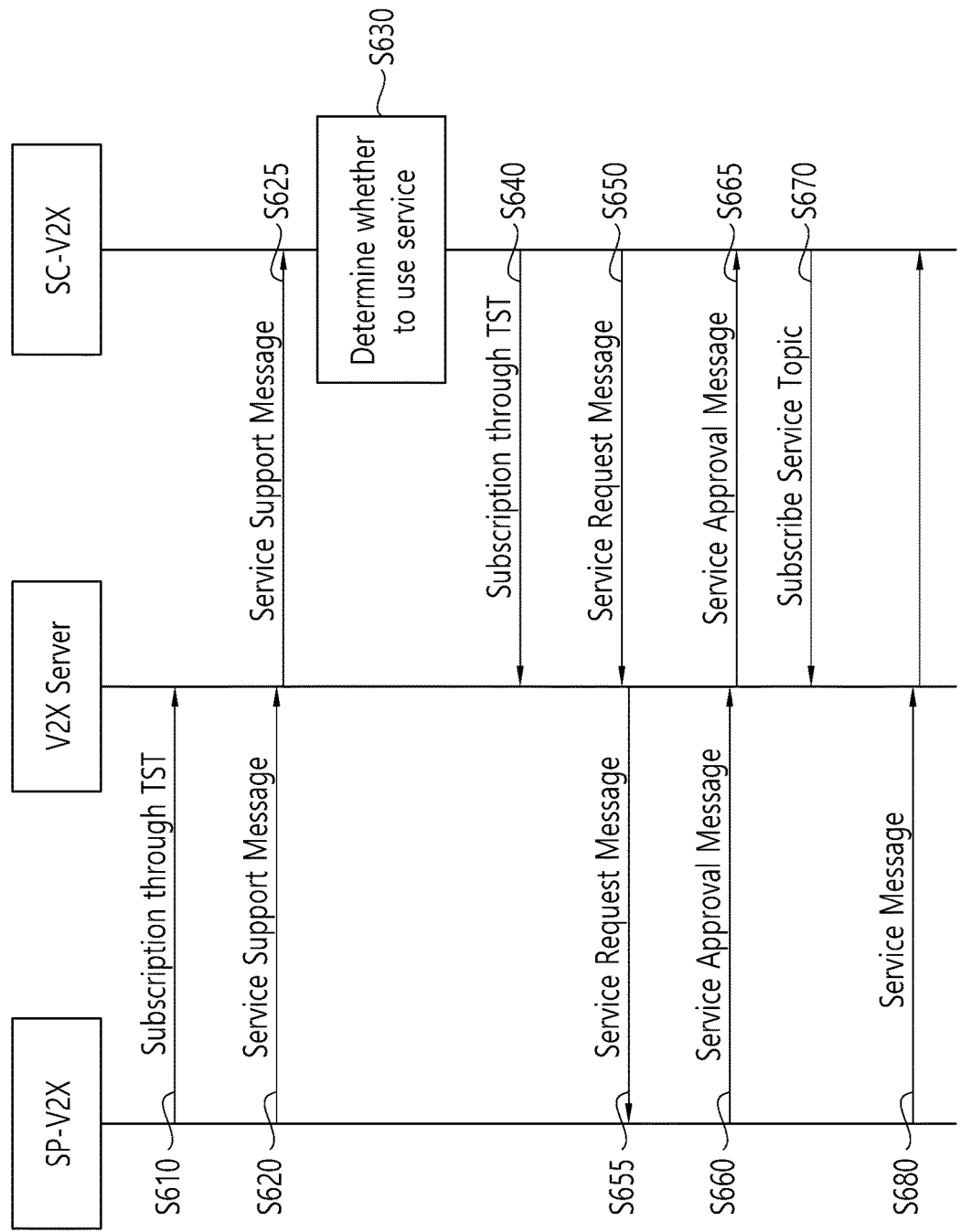
FIG. 6 shows a method for a multicast V2X service according to an embodiment of the present specification.

FIG. 6 shows a method for a multicast V2X service according to an embodiment of the present specification. Assume that the SC-V2X has previously registered the subscription area to the V2X server according to the embodiment of FIG. 4.

In step S610, the SP-V2X decides to provide a multicast service, and subscribes to the V2X server through the TST. The V2X server creates a logical channel for the multicast service. Subscription means that the V2X server that receives a message registers a topic. Afterwards, the V2X server delivers a received message to a V2X device which registers the topic according to the topic of the received message.

SP-V2X determines a service topic and a service area that is a serviceable area. The service area may be determined based on location, speed, heading, road type, congestion level, and the like.

In step S620, the SP-V2X transmits a service support message for informing supported service to the V2X server. The service support message may include at least one of a service type, a service valid time, location of SP-V2X, TST and service area. The service support message may further include at least one of the information elements of Table 1. The service type indicates a type of multicast service supported. The service valid time may indicate a duration during which the corresponding multicast service is served.

In step S625, the V2X server delivers the service support message to the SC-V2X. The V2X server may deliver the service support message to SC-V2X having a subscription area that overlaps a part or all of the service area.

In step S630, the SC-V2X may determine whether to use the multicast service autonomously or according to a user's input. For example, the SC-V2X may display the location and/or multicast service of the SP-V2X on the screen, and wait for the user's input.

In step S640, if the SC-V2X determines to use the multicast service, the SC-V2X subscribes to the V2X server by using its own TSRT.

In step S650, the SC-V2X transmits a service request message for requesting a service to the V2X server. The service request message may include at least one of a service type, a location of the SC-V2X device, and a TSRT. The service request message may be published through TST to the V2X server.

In step S655, the V2X server receiving the service request message delivers the service request message to the SP-V2X subscribing to the TST.

In step S660, when the SP-V2X determines to approve the subscription of the requested service, the SP-V2X transmits a service approval message to the V2X server. The service approval message may include at least one of a service topic, a service type, a service valid time, and a location of the SP-V2X. The service approval message may be published to the V2X server through TSRT.

In step S665, the V2X server receiving the service approval message delivers the service approval message to the SC-V2X subscribing to the TSRT.

In step S670, the SC-V2X extracts the service topic from the received service approval message, and subscribes to the V2X server as the service topic.

In step S680, the SP-V2X transmits a service message to the V2X server through the service topic. The V2X server receiving the service message delivers the service message to all SC-V2Xs subscribing to the service topic. The service message may include data packets according to the corresponding service type. For example, the service message may include video streaming packets generated by the SP-V2X. The service message may further include at least one of the information elements of Table 1.

Figure 7:
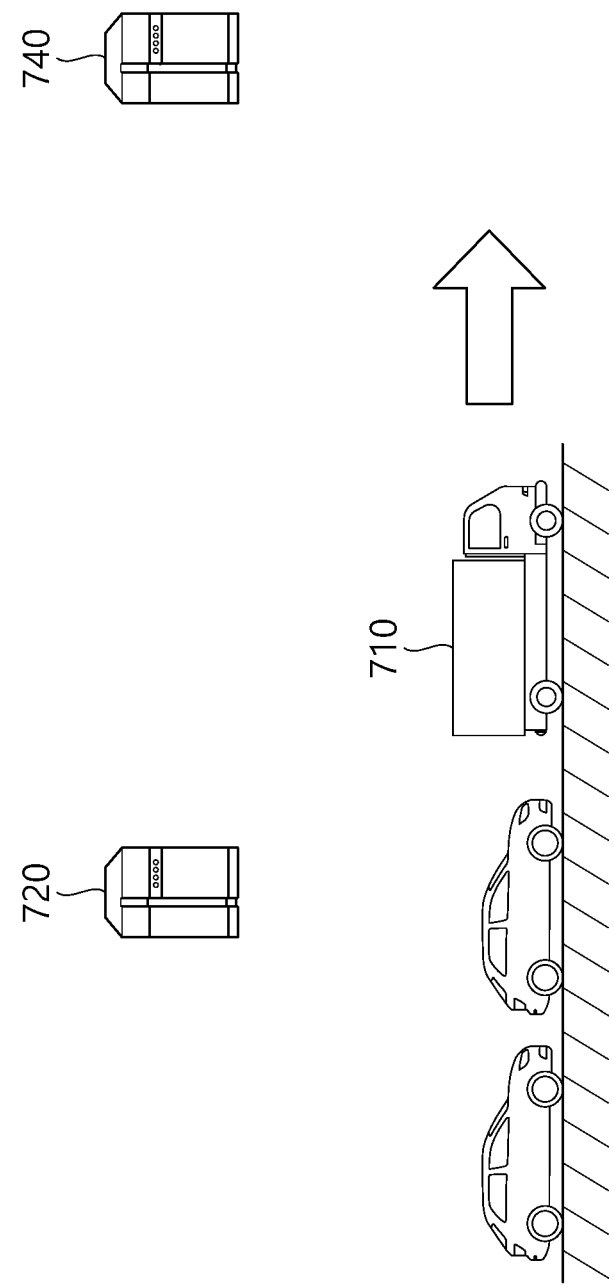
FIG. 7 shows an example of handover between V2X servers for a multicast service.

FIG. 7 shows an example of handover between V2X servers for a multicast service.

As shown in the embodiment of FIG. 6, a SP-V2X 710 has completed registration of a service topic for providing a multicast service with a first V2X server 720. As the SP-V2X 710 moves, the SP-V2X 710 may enter the management area of a second V2X server 740.

The SP-V2X 710 transmits a service message through the service topic to the second V2X server 740. The service message includes information on a service area. The V2X servers may determine whether to perform handover based on the service area. The second V2X server 740 checks the service area in the service message.

If the service area of the SP-V2X 710 does not relate to the management area of the second V2X server 740, the second V2X server 740 delivers the service message to the first V2X server 720. The first V2X server 720 transmits the service message to SC-V2Xs subscribing to the first V2X server 720 as the service topic.

If the service area of the SP-V2X 710 relates to the management area of the second V2X server 740, the second V2X server 740 transmits the service message to SC-V2Xs subscribing the delivered service topic. The second V2X server 740 requests a non-subscription to the service topic for the first V2X server 720.

Figure 8:
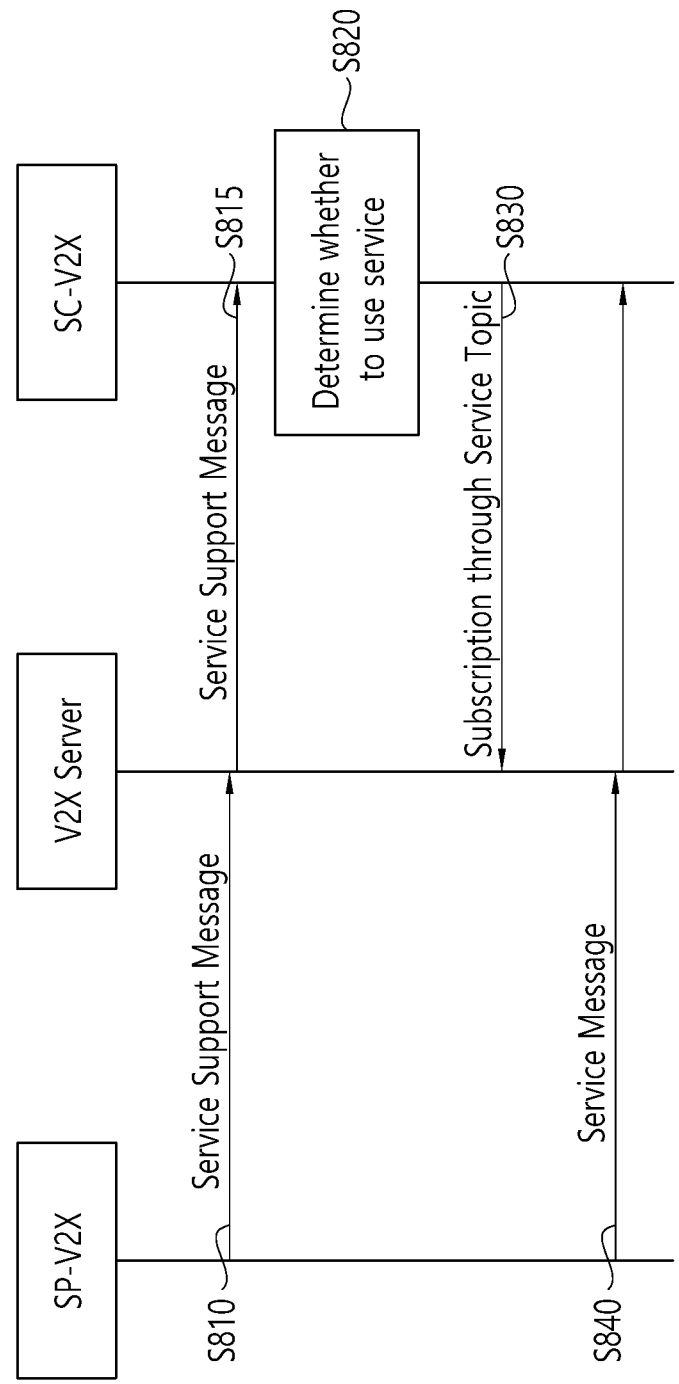
FIG. 8 shows a method for a multicast V2X service according to another embodiment of the present specification.

FIG. 8 shows a method for a multicast V2X service according to another embodiment of the present specification. Assume that an SC-V2X has previously registered the subscription area to a V2X server according to the embodiment of FIG. 4. This method relates to a case where the service provider's approval is not required.

The SP-V2X decides to provide a multicast service at a specific point in time, and determines a service topic and a service area for the multicast service. The service area may be determined in consideration of speed, heading, road type, congestion level, and the like.

In step S810, the SP-V2X transmits a service support message to the V2X server. The service support message may include at least one of a service type, a service effective time, a location of SP-V2X, a service topic, and a service area. The service support message may further include at least one of the information elements of Table 1.

In step S815, the V2X server delivers the service support message to an SC-V2X. The V2X server may deliver the service support message to the SC-V2X having a subscription area that overlaps a part all of the service area.

In step S820, the SC-V2X may determine whether to use the multicast service autonomously or according to a user input. For example, the SC-V2X may display the location and/or multicast service of the SP-V2X on the screen, and wait for the user's input.

In step S830, if the SC-V2X decided to use the multicast service, the SC-V2X extracts a service topic from the received service support message, and subscribes to the V2X server as a service topic.

In step S840, the SP-V2X transmits a service message to the V2X server through the service topic. The V2X server receiving the service message delivers the service message to all SC-V2X subscribing to the service topic. The service message may include data packets according to a corresponding service type. For example, the service message may include video streaming packets generated by SP-V2X. The service message may further include at least one of the information elements of Table 1.

Figure 9:
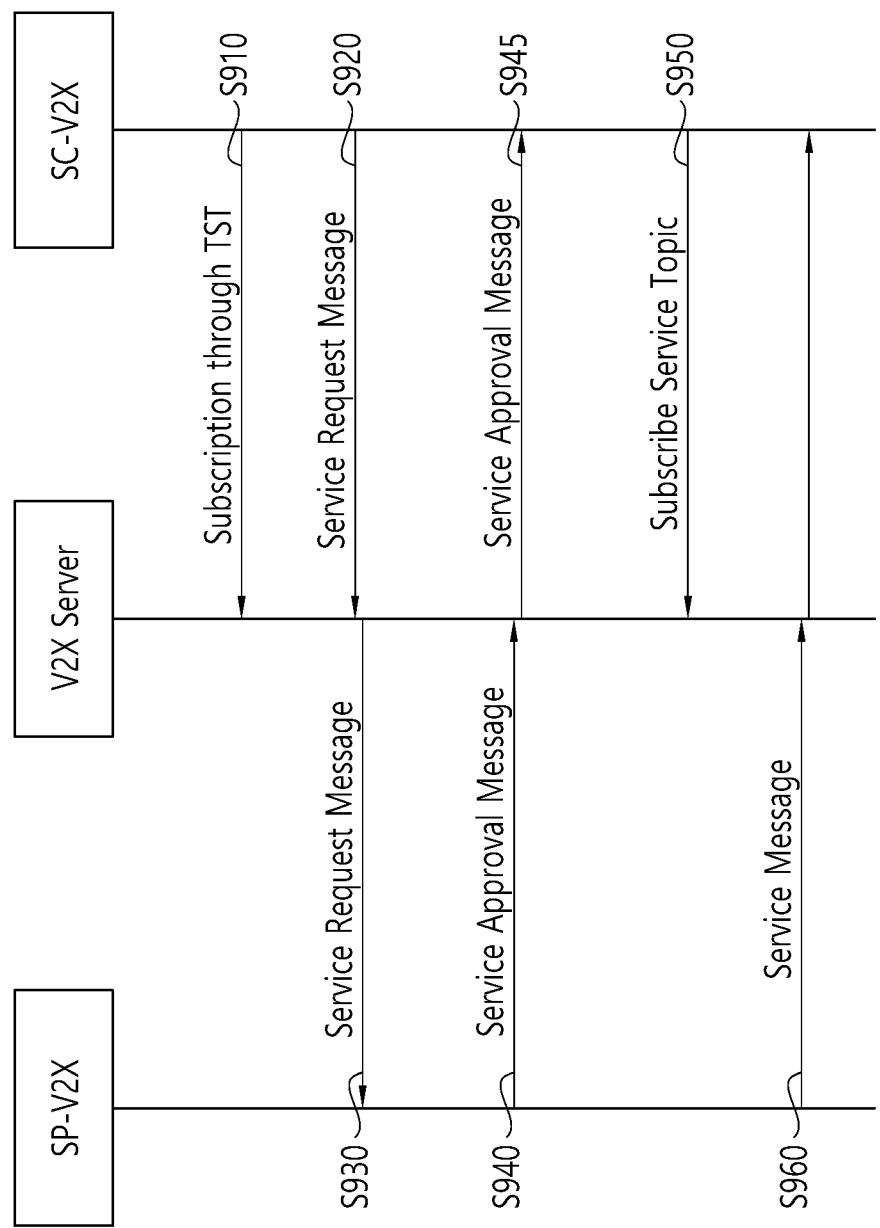
FIG. 9 shows a method for a multicast V2X service according to another embodiment of the present specification.

FIG. 9 shows a method for a multicast V2X service according to another embodiment of the present specification. This process relates to a case where SC-V2X directly requests multicast service from SP-V2X.

In step S910, an SC-V2X creates a service area and a TSRT for a multicast service that the SC-V2X wants to be served, and subscribes to a V2X server as the TSRT.

In step S920, the SC-V2X transmits a service request message to the V2X server. The service request message may include at least one of a service type, the service area, and the TSRT.

In step S930, the V2X server transmits a service request message to one or more SP-V2X related to the service area.

In step S940, the SP-V2X that has approved the multicast service sends a service approval message to the V2X server. The service approval message includes the service topic. The service approval message may be published to the V2X server through TSRT.

In step S945, the V2X server receiving the service approval message delivers the service approval message to the SC-V2X subscribing to the TSRT.

In step S950, the SC-V2X extracts the service topic from the received service approval message, and subscribes to the V2X server as the service topic.

In step S960, the SP-V2X transmits a service message to the V2X server through the service topic. The V2X server receiving the service message delivers the service message to all SC-V2X subscribing to the service topic. The service message may include data packets according to a corresponding service type. For example, the service message may include video streaming packets generated by SP-V2X. The service message may further include at least one of the information elements of Table 1.

The following table shows messages exchanged between V2X devices or between V2X devices and V2X servers in the above-described embodiment.

TABLE 2

| Message Format | S/P | Channel | Sender | Receiver |
| --- | --- | --- | --- | --- |
| Subscription | S | TST | SP-V2X | V2X Server |
| Service Support Message (incl. TST) | P | SA | SP-V2X | V2X device within SA |
| Service Support Message (incl. ST) | P | SA | SP-V2X | V2X device within SA |
| Subscription | S | TSRT | SC-V2X | V2X Server |
| Service Request Message (incl. TSRT) | P | TST | SC-V2X | SP-V2X |
| Service Request Message (incl. TSRT) | P | SA | SC-V2X | SP-V2X |
| Service Approval Message (incl. ST) | P | TSRT | SP-V2X | SC-V2X |
| Subscription | S | ST | SC-V2X | V2X Server |
| Service Message | P | ST | SP-V2X | SC-V2X |

TABLE 3

| Message Format | A/N | P/C | Description |
| --- | --- | --- | --- |
| Subscription | A | P | Subscribe TST channel |
| Service Support Message (incl. TST) | A | P | SP-V2X transmits service provision information |
| Service Support Message (incl. ST) | N | P | SP-V2X transmits service provision information |
| Subscription | A | P | Subscribe TSRT channel |
| Service Request Message (incl. TSRT) | A | P | SC-V2X requests approval of service subscription |
| Service Request Message (incl. TSRT) | A | C | SC-V2X requests approval of service subscription |
| Service Approval Message (incl. ST) | A | P/C | SP-V2X approves service subscription |
| Subscription | A/N | P/C | Subscribe ST channel |
| Service Message | A/N | P/C | Provide service |

In 'S/P', 'S' means subscription, and 'P' means publication. Subscription means that a server that receives a message performs a role of subscription, and publishing means a transmission of a message. A channel is used to distinguish a logical channel for delivering messages. Service Area (SA) denotes an area-based logical channel, and TST/TSRT/Service Topic (ST) denotes service-based logical channels. A sender represents a device which transmits a message, and a receiver represents a V2X server or a V2X device that finally receives a message via a V2X server. For example, if an SC-V2X receives a message through a V2X server, the SC-V2X is the receiver.

In 'A/N', 'A' represents approval, and 'N' represents non-approval. Approval represents a message used when approval of the service provider is required, and non-approval represents a message used when approval of the service provider is not required. In 'P/C', 'P' indicates a message used for a method in which SP-V2X first advertises a service to provide a service, and 'C' indicates a message used for a method in which SC-V2X directly requests a service without SP-V2X's service advertisement.

The following table shows the logical channels used in the above-described embodiment.

TABLE 4

| Channel | User | Description | Message Format used | A/N |
| --- | --- | --- | --- | --- |
| SA | SP-V2X | Deliver area of services provided | Service Support Message | A/N |
| | V2X Server | Handover between V2X servers | Service Message | A/N |
| TST | SP-V2X | Subscribe a channel to communicate with SC-V2X | Subscription | A |
| | SC-V2X | Request service subscription to SP-V2X | Service Request Message | A |
| TSRT | SC-V2X | Subscribe a channel to communicate with SP-V2X | Subscription | A |
| | SP-V2X | Approve service subscription to SC-V2X | Service Approval Message | A |
| ST | SC-V2X | Subscribe a channel to provide service of SP-V2X | Subscription | A/N |
| | SP-V2X | Provide service to SC-V2X | Service Message | A/N |

In 'A/N', 'A' represents approval, and 'N' represents Non-Approval. Approval represents a message used when approval of the service provider is required, and non-approval represents a message used when approval of the service provider is not required.

SA is the range of services provided by SP-V2X, and is expressed as a combination of one or more tiles. SA is used as a logical channel between SP-V2X and V2X devices in the SA. The service support message may be delivered to the V2X devices in the SA through the V2X server through the SA. In addition, SA can be utilized in a handover situation between V2X servers. The service message includes information about the SA. The V2X server checks the SA in the service message, and if there is an area that is not managed by the V2X server, the V2X server mat deliver the service message to another V2X server.

TST and TSRT are only used for services that require service provider approval. TST is used as a temporary channel from SC-V2X to SP-V2X for service subscription request. When the SC-V2X publishes the service request message through the TST, the SP-V2X may receive the service request message through the V2X server.

TSRT is used as a temporary channel from SP-V2X to SC-V2X for service subscription approval. TSRT is generated for each SC-V2X, and enables unicast communication between SC-V2X and SP-V2X. When the SP-V2X publishes the service approval message through the TSRT, the SC-V2X may receive the service approval message through the V2X server.

ST is used as a logical channel from SP-V2X to SC-V2X for service subscription approval. When SP-V2X publishes a service message using ST, SC-V2X may receive the service message via the V2X server.

In the above examples, although the methods have been described based on the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

What is claimed is:

1. A vehicle-to-everything (V2X) device for V2X service, the V2X device comprising:
   a processor; and
   a memory operatively coupled with the processor and configured to store instructions that, when executed by the processor, cause the V2X device to perform functions comprising:
   determining a service area in which a multicast service is to be provided by the V2X device;
   generating a first logical channel for requesting a subscription of the multicast service;
   transmitting, to a V2X server, a service support message for requesting that the V2X server registers the multicast service indicated by the first logical channel and delivers the service support message to a consumer V2X device which has a subscription area overlapping a part or all of the service area, the subscription area being an area where the consumer V2X device requests a subscription to the V2X server, the service support message including information on the service area and the first logical channel;
   receiving, from the V2X server, a service request message for requesting approval of the consumer V2X device's subscription of the multicast service, the service request message including information on a second logical channel for approving the subscription of the multicast service;
   generating a third logical channel for providing the multicast service; and
   transmitting, to the V2X server, a service approval message through the second logical channel for approving the consumer V2X device's subscription of the multicast service, the service approval message including information on the third logical channel.

2. The V2X device of claim 1, wherein the second logical channel is generated by the consumer V2X device, and the consumer V2X device delivers information on the second logical channel to the V2X server.

3. The V2X device of claim 1, wherein the functions further comprise:
   transmitting, to the V2X server, a service message for the multicast service through the third logical channel so that the V2X server delivers the service message to all consumer V2X device which subscribe to the multicast service through the third logical channel,
   wherein the service approval message includes information on the third logical channel for providing the multicast service.

4. A method for vehicle-to-everything (V2X) service performed by a V2X device, the method comprising:
   determining a service area in which a multicast service is to be provided by the V2X device;
   generating a first logical channel for requesting a subscription of the multicast service;
   transmitting, to a V2X server, a service support message for requesting that the V2X server registers the multicast service indicated by the first logical channel and delivers the service support message to a consumer V2X device which has a subscription area overlapping a part or all of the service area, the subscription area being an area where the consumer V2X device requests a subscription to the V2X server, the service support message including information on the service area and the first logical channel;
   receiving, from the V2X server, a service request message for requesting approval of the consumer V2X device's subscription of the multicast service, the service request message including information on a second logical channel for approving the subscription of the multicast service;
   generating a third logical channel for providing the multicast service; and
   transmitting, to the V2X server, a service approval message through the second logical channel for approving the consumer V2X device's subscription of the multicast service, the service approval message including information on the third logical channel.

5. The method of claim 4, wherein the second logical channel is generated by the consumer V2X device, and the consumer V2X device delivers information on the second logical channel to the V2X server.

6. The method of claim 4, further comprising:
   transmitting, to the V2X server, a service message for the multicast service through the third logical channel so that the V2X server delivers the service message to all consumer V2X device which subscribe the multicast service through the third logical channel.

* * * * *